INVENTORS
ROBERT V. POLE
ROBERT A. MYERS
EUVAL S. BARREKETTE
JAEN NUÑEZ

BY Edward G. Fiorito
ATTORNEY

3,440,561
APPARATUS EMPLOYING ELECTRONIC LIGHT SHUTTERS FOR SWITCHING THE DIRECTION OF A LASER BEAM ALONG DISCRETE PATHS

Robert V. Pole, Yorktown Heights, Robert A. Myers and Euval S. Barrekette, New York, and Jaen Nunez, Flushing, N.Y., assignors to International Business Machines Corporation, New York, N.Y., a corporation of New York
Filed June 25, 1964, Ser. No. 377,957
Int. Cl. H01s 3/05
U.S. Cl. 331—94.5                                    3 Claims

ABSTRACT OF THE DISCLOSURE

A laser apparatus is described containing an active laser element shaped in the form of a lens. A plurality of plane mirrors are placed around the active element, each one aligned perpendicular to a path from the active element to the mirror. A concave mirror is located concentrically about the active element lens in the focal surface of the lens thereby forming a resonant cavity between each plane mirror and the concentric mirror. Electronic light shutters are placed in each of the paths and when activated diminish the intensity of the light reflected along selected ones of the paths. The laser emits light along the path or paths having the lowest loss of light, that is, the highest quality factor Q. Thus, the laser beam can be switched from one path to another at very high speeds with only small control power.

---

There are many devices capable of changing the direction of a beam of laser light. For example, adjustable mirrors can deflect a beam along various paths, or the entire laser can be rotated to a new direction. However, most of these schemes are relatively slow due to the inertia of the moving parts.

Another method of altering the direction of a laser beam is to pass it through certain types of birefringent crystals controlled by electrical signals. While this method provides a relatively fast change in direction, the angular swing is small and the beam loses some of the natural high directivity and intensity associated with laser light.

Satisfactory solutions to the above problems are shown in commonly assigned, co-pending application Ser. No. 332,617 entitled, "Scanning Laser," by Robert V. Pole, and commonly assigned, application Ser. No. 378,220 filed concurrently herewith and entitled, "Laser Beam Switching," by Jaen Nunez and Robert V. Pole. In the former application two concentric mirrors are located about a laser element so that a resonant cavity is formed. A laser beam is caused to scan across one of the concenrtic mirrors by adjusting the position of maximum reflectivity within the cavity. The present invention is directed to a modification of the co-pending application of Robert V. Pole, which permits a laser beam to be switched between a number of discrete paths having highly directional parallel light therein.

The present invention differs from the concurrently filed application by Jaen Nunez and Robert V. Pole in that the present invention employs a laser shaped in the form of a lens.

It is an object of the present invention to provide apparatus for switching the direction of a laser beam along precisely defined discrete paths.

Another object of the present invention is to provide apparatus capable of switching laser beams rapidly with a wide angular deflection and highly directional beam path.

A further object of the present invention is to provide laser beam switching apparatus capable of easy construction and alignment.

Still another object of the present invention is to provide laser beam switching apparatus capable of providing a highly directional beam of parallel rays and also a focused beam having high resolution.

These and other objects of the present invention are accomplished by providing an active laser element shaped in the form of a lens. A plurality of plane mirrors are placed about the laser, each one aligned perpendicular to a path from the laser to the mirror. A concave mirror is located concentrically about the laser lens in the focal surface of the lens. In this manner, resonant cavities are formed between the plane mirrors and the concentric mirror.

Electronic light shutters are placed in each of the paths to diminish the intensity of the light reflected along selected ones of the paths. The laser emits light along the path, or paths, having the lowest loss of light (highest quality factor Q).

By using various well-known electronic light shutters, the laser beam can be switched from one path to another at very high speeds with only small control power. Further, the direction of the beam is dependent upon the position of the mirrors rather than the exact magnitude of the control signal.

Another advantage of the present invention is the preservation of the natural high directivity of the laser beam which is deflected internally at the point of creation rather than by external deflecting means such as a birefringent crystal.

The laser beam emerging from the plane mirrors of the present invention is highly directional containing parallel rays of light. On the other hand the beam is focused at a point on the concave mirror with high resolution. Therefore the present invention has dual capabilities. The highly directional beam may be used for radar or communication applications, while the focused beam may be employed in the same manner that cathode ray tubes are used.

Still another advantage of the present invention is the high angular deflection attainable due to the ability of the laser to emit along paths having large angular displacements.

In accordance with another aspect of the present invention a unique type of light shutter is used in combination with the laser and mirror structure of the present invention. A linear polarizer is located in each of the paths. A group of fixed compensators each having different values introduce phase delays in the light along each path. A Kerr cell is inserted in each of the paths to introduce a variable phase delay. By adjusting the voltage on the Kerr cell, a phase delay can be introduced which is counter-acted by one of the fixed compensators. In this manner one of the paths is made to achieve the highest Q causing the laser to emit along this path. This form of light shutter permits the laser beam to be switched rapidly in response to a small change in control power. The tolerance of the control signal need only be sufficient to create a preferred path; the direction of the path is determined by the mirrors.

The foregoing and other objects, features and advantages of the invention will be apparent from the following more particular description of preferred embodiments of the invention, as illustrated in the accompanying drawings.

Figure 1:
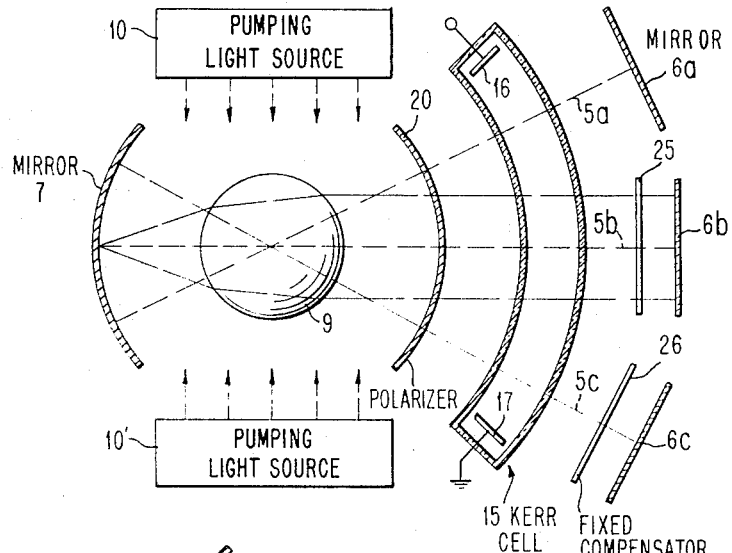
FIG. 1 is a diagram embodying the present invention capable of switching a laser beam between three paths.

The apparatus shown in FIG. 1 is capable of switching a laser beam between three paths 5a, 5b and 5c. A group of plane mirrors 6a–c is placed at one end of the paths 5a–c respectively, while a spherically concave mirror 7 is located at the other end of the paths 5.

A spherical ruby laser 9 is located at the intersection of paths 5a–c. The laser 9 acts as a lens converging the parallel rays reflected from mirrors 6a–c. The manner in which the rays are caused to converge is described in detail with reference to FIG. 2. Mirror 7 is located at the point where the converging rays meet, a plurality of such points defining the focal surface of the laser 9. Since the laser 9 is in a spherical shape, the focal surface is also a sphere. FIG. 1 is a two dimensional illustration of a spherical laser 9 and mirror 7.

The laser 9 is pumped by light sources 10 and 10'. While sources 10 and 10' are shown to be two separate blocks in FIG. 1, they may be a single helical flash tube wrapped about laser 9. Sources 10 and 10' pump energy into the laser by inverting the population of its energy levels in a well-known manner. A resonant cavity is formed along each of the paths 5a–c. If the intensity of the light along paths 5 is not reduced, the laser will oscillate and emit high energy beams in all three directions simultaneously.

The laser 9 can be forced to emit a high energy laser beam along any one or several of the paths 5 if the resonant quality factor Q of the cavities is decreased by inserting suitable light shutters in series with paths 5. The light shutters shown in FIG. 1 consist of a nitrobenzene Kerr cell 15 having a pair of electrodes 16 and 17 across which a voltage may be applied. The Kerr cell 15 may have any shape sufficient to embrace the paths 5. A polarizer 20 linearly polarizes the light emitted from laser 9 along paths 5.

The polarizer 20 is oriented with its axes at 45° with respect to the direction of the electric field between electrodes 16 and 17. The two perpendicular components of the plane polarized light passing through polarizer 20 have a relative phase delay introduced between them by the Kerr cell 15 in a conventional manner. The light emerging from the Kerr cell is called elliptically polarized light. The amount of relative phase delay between the two components and consequently the amount of ellipticity is proportional to the square of the voltage applied to the electrodes 16 and 17.

When no voltage is applied across electrodes 16 and 17 in FIG. 1 the plane polarized light along path 5a passes through Kerr cell 15 without any change in phase between the two perpendicular components. The light is reflected from mirror 6a and passes through Kerr cell 15 once again. Polarizer 20 acts as an analyzer for the reflected light passing light polarized only in the direction matching the axes of polarizer 20. Since there is no voltage across the electrodes 16 and 17 substantially all of the light passes through polarizer 20 after reflection from mirror 6a. Therefore the light is unobstructed and the Q of the cavity along 5a remains the same.

If a voltage is applied to electrodes 16 and 17, Kerr cell 15 introduces a phase delay producing elliptically polarized light. The light is reflected from mirror 6a and passes through Kerr cell 15 for a second time thereby doubling the ellipticity of the light. When the elliptically polarized light along path 5a passes back through polarizer 20, the latter acts as an analyzer passing only that component of the elliptically polarized light which is parallel to the axes of polarizer 20. The magnitude of this component is smaller than the magnitude of the original plane polarized light and is a cosine square function of the double phase delay introduced by Kerr cell 15. Therefore the light is somewhat obstructed and the Q of the cavity along path 5a is reduced.

Selectivity between paths 5a–c is accomplished by introducing a pair of fixed compensators 25 and 26. Each compensator introduces a different amount of phase delay between the two perpendicular components of the light emerging from the Kerr cell 15. While the Kerr cell 15 delays one component of light, the compensators 25 and 26 are selected to delay the other perpendicular component of light so that compensation can be achieved. For example, when a particular voltage is applied to terminals 16 and 17, Kerr cell 15 delays one component of the light along path 5b. Compensator 25 delays the other component so that substantially plane polarized light arrives at mirror 6b. After reflection compensator 25 introduces a phase delay to one component while Kerr cell 15 introduces the same amount of phase delay to the other component thereby providing substantially plane polarized light which is passed by a polarizer 20. Therefore for this particular voltage the Q along path 5b is undiminished.

However, since compensator 26 introduces a different amount of phase delay, the voltage which causes compensation in path 5b produces a mismatch in path 5c diminishing the Q thereof. Further, any voltage applied to Kerr cell 15 diminishes the Q along path 5a which includes no compensator. Still another voltage applied to electrodes 16 and 17 causes compensation along path 5c while diminishing the Q in the other paths 5a and 5b.

While only a single Kerr cell 15 is employed in FIG. 1, a plurality of cells could be used, one for each path. The same voltage may be applied to each Kerr cell and the operation is the same as described above.

Figure 2:
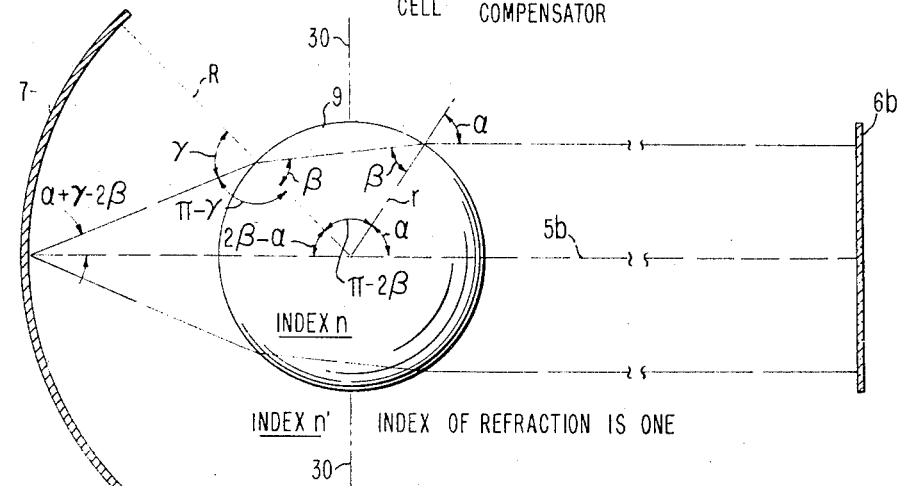
FIG. 2 is a diagram including one of the laser beams of FIG. 1 shown in a larger scale to illustrate the angular beam path.

FIG. 2 employs the same reference numerals applied to a few of the elements in FIG. 1. The scale in FIG. 2 is increased in order to illustrate the angular course followed by the light along path 5b. The exact location of the spherically concave mirror 7 is a function of the radius $r$ of the spherical laser 9. Mirror 7 is concentric about the center of laser 9 and has a radius R.

The ratio of R to $r$ can be developed as a function of the indices of refraction of the various media through which light passes along path 5b. While other media could be employed it will be assumed that air exists adjacent to mirror 6b having an index of refraction of one, that the laser 9 has an index of refraction $n$, and that a medium exists between mirror 7 and laser 9 to the left of a broken line 30 in FIG. 2 having an index of refraction $n'$. The various angles created by the lens action of laser 9 are labeled in FIG. 2.

By the definition of the index of refraction, $$\sin \alpha / \sin \beta = n$$

and $\sin \beta / \sin \gamma = n'/n$.

By the law of sines, $r/\sin(\alpha+\gamma-2\beta) = R/\sin(\pi-\gamma)$. Therefore $R/r \cong \gamma/(\alpha+\gamma-2\beta)$.

$$R/r \cong 1/[(n'+1)-2n'/n]$$

Expression 1

By constructing the mirror 7 and laser 9 in accordance with Expression 1, any light diverging from a point on mirror 7 emerges from laser 9 in plane parallel rays. Therefore plane mirrors such as mirrors 6 may be positioned anywhere on the side opposite to mirror 7 and at any distance from the laser 9. The only alignment necessary for mirrors 6 is that they be arranged perpendicular to the path through the center of laser 9. It has been found that the alignment necessary to achieve successful lasing of the ruby can be accomplished relatively easily without the use of complicated aligning procedures and apparatus.

The following table lists the dimensions and the values of parameters of a device embodying the present invention which operated successfully; the values are not limits on the operation of the device, nor is the invention limited to these particular values:

| | |
|---|---|
| Laster material | Ruby crystal. |
| Angle between the extreme ends paths | 22°. |
| Radius r of ruby laser | 12.7 mm. |
| Radius R of mirror | 15.8 mm. |
| Index of refraction $n'$ | 1.51. |
| Perpendicular alignment of plane mirrors | ±3 seconds of arc. |
| Pumping light source energy | 320 joules. |

Figure 3:
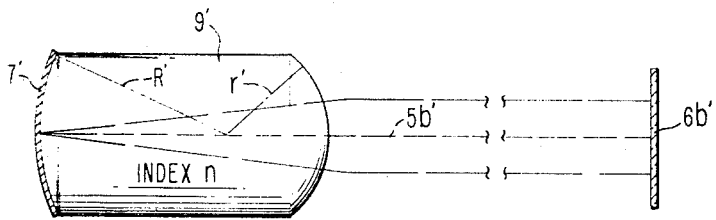
FIG. 3 is a diagram illustrating a laser having a lens configuration capable of use in the present invention.

FIG. 3 illustrates a cylindrical ruby laser 9' having a lens design capable of use in the present invention. A coating 7' applied directly to one end of the cylindrical laser 9' replaces the mirror 7 in FIGS. 1 and 2. This may be accomplished by proper selection of the radii R' and r' of the spherical ends of the cylindrical laser 9' shown in FIG. 3.

Setting $n'$ to be equal to $n$, Expression 1 reduces to:

$$R'/r' \cong 1/(n-1)$$

Expression 2

Expression 2 defines a beam path 5b wherein the convergence and focusing of the beam takes place entirely within the laser 9'. Therefore the index of refraction $n'$ in FIG. 2 is set to equal $n$.

FIG. 3 illustrates one modification in the design of the ruby 9. Other modifications can be made such as removing the extreme upper and lower portions of the ruby having no rays of light passing therethrough.

The device shown in FIG. 1 has dual utility since the laser beam can be utilized from either end of the paths 5a–c. For example, if the mirrors 6 are only partially reflecting, lasing light passes through in parallel rays having a high degree of directivity. This beam of light can be used in communication systems by modulating the light with information bearing signals. By directing each of the paths 5a–c at distant receivers information can be transmitted selectively to one or more of the receivers.

The other distinct capability of the device shown in FIG. 1 may be utilized by may be utilized by making the mirror 7 only partially reflecting, permitting the lasing light to pass through. By increasing the number of paths 5 this highly focused beam may be used in the manner that a cathode ray tube is employed with the further advantage of high resolution and high beam power.

Another advantage of the present invention is the remote position of mirrors 6 shown in FIG. 1. Since the rays of the beams along path 5 are parallel, the mirrors 6 may be removed suufficiently from the laser 9 to permit the insertion of light shutter apparatus such as polarizer 20, Kerr cell 15 and fixed compensators 25 and 26. However the light shutter apparatus need not be placed between mirrors 6 and laser 9, but may be placed between mirror 7 and laser 9. One such light shutter arrangement capable of use in the latter mentioned position is shown in the above copending application Ser. No. 332,617 by Robert V. Pole.

While all of the paths 5 have been shown to be in the plane of the FIG. 1, other paths may be added which form an angle with the plane of FIG. 1 since laser 9 is spherical. Where only paths 5a–c are used, laser 9 may be cylindrical in shape.

A further modification of the present invention can be made by forming the mirror 7 in discrete sections, each section including one of the points where paths 5 are focused. Futher, if the resolution of the focusing is high at the point of convergence, there is little difference between a mirror having a radius R and a plane mirror located at the point of reflection.

Still another modification can be made where the laser light has a natural polarized emission. In this case the optic axes of the laser 9 may be oriented 45° with respect to the plane of FIG. 1, permitting the elimination of polarizer 20.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for switching the direction of a laser beam between a plurality of discrete paths, comprising:
   a laser element shaped in the form of a spherical lens having a focal surface;
   a plurality of plane mirrors each one located perpendicular to a different one of said laser beam paths forming one end of said paths;
   a mirror located in said focal surface to reflect said beams focused by said laser back along the same path forming resonant cavities, said reflected beams in each path emerging from said laser in plane parallel rays; and
   control means located in each of said paths and operable selectively for diminishing the intensity of light along certain of said paths thereby establishing at least one preferred path having a higher quality factor Q for permitting emission of a laser beam along said preferred path.

2. Apparatus as defined in claim 1 wherein said control means includes:
   polarizing means located in each of said paths;
   fixed compensator means loacted in each path for introducing a different amount of phase delay into the light along each of said paths; and
   means for introducing a variable amount of phase delay in the light along each of said paths whereby the phase delay in only one of said paths is compensated.

3. Apparatus for switching the direction of a laser beam between a plurality of discrete paths, comprising:
   a laser element shaped in the form of a spherical lens having a radius $r$;
   a plurality of plane mirrors each located perpendicular to a different one of said laser beam paths forming one end of said paths;
   a spherically shaped mirror located concentrically about said spherical laser element and having a radius R where the ratio $$R/r \cong 1/[(n'+1) - 2n'/n]$$

were $n$ and $n'$ are the index of refraction for said laser element and the index of the medium between said spherically shaped mirror and said laser element respectively; and
   control means located in each of said paths including,
      polarizing means located in each of said paths;
      fixed compensator means located in each path for introducing a different amount of phase delay into the light along each of said paths; and
      means for introducing a variable amount of phase delay in the light along each of said paths whereby the phase delay in only one of said paths is compensated producing a higher quality factor Q for creating emission of a laser beam along the compensated path.

References Cited

UNITED STATES PATENTS

| | | | |
|---|---|---|---|
| 3,177,446 | 4/1965 | Hoadley et al. | 331—94.5 |
| 3,293,565 | 12/1965 | Hardy | 331—94.5 |
| 3,344,365 | 9/1967 | Lewis | 331—94.5 |

OTHER REFERENCES

McClung et al.: Research Rep No. 213, Hughes Res. Labs., Malibu, Calif., September 1961.

JEWELL H. PEDERSEN, *Primary Examiner.*

E. BAUER, *Assistant Examiner.*